Oct. 31, 1967     J. J. MELE     3,349,649

PRESS-FIT BUSHING

Filed July 26, 1965

INVENTOR.
JOSEPH J. MELE

BY *Charles Marks*

ATTORNEY

United States Patent Office 3,349,649
Patented Oct. 31, 1967

3,349,649
PRESS-FIT BUSHING
Joseph J. Mele, 188 Warner Road,
Huntington, N.Y. 11743
Filed July 26, 1965, Ser. No. 474,710
4 Claims. (Cl. 77—62)

ABSTRACT OF THE DISCLOSURE

A press-fit bushing having tapered annular grooves which are wider than the adjacent lands of the bushing. The material of the aperture wherein the bushing is press-fit is permitted to flow into the groves without being subjected to substantial shear by the edges of the grooves.

---

This invention relates to press-fit drill bushings. Such bushings are assembled for operative use by pressing or urging them into suitable apertures provided in tooling plates and the like, where the bushings can then be employed in the conventional manner for the guidance of a drill.

In order to secure the bushings in such apertures, it has been customary to make their inside diameter smaller than the outside diameter of the bushings, thereby providing an interference fit and insuring a firm grip between the bushings and the apertures in which they are received. However, by reason of such interference, the inside diameter of conventional bushings often udergo a corresponding reduction in diameter and when such interference is excessive, they often fail to accommodate the drills or other members which are intended for reception therein.

To avoid this result, it has been necessary to employ highly skilled machinists who form the apertures within very small tolerances; and it has also been desirable to grind the external periphery of the bushings to precise dimensions. In addition, it has sometimes been deemed desirable to form stepped apertures wherein only a portion thereof is machined to a close tolerance.

However, all of these approaches entail corresponding expense. Apart from this, with the passage of time, conventional bushings, whether exposed to these approaches or not, the effects of creep and stress relief are such that they often become inoperative by reason of their loosening within the apertures in which they are confined.

The present invention is intended as a solution to these problems. Thus, it is an object of the present invention to provide an improved press-fit drill bushing which can be assembled within an aperture formed in accordance with a greater tolerance than that conventionally adhered to.

Another object of the invention is to provide a press-fit drill bushing of the character last-described which does not undergo excessive collapse or reduction of its internal diameter when it is assembled for operative use within said aperture.

Another object of the invention is to provide a press-fit bushing whose external periphery does not require grinding prior to its operative use.

A further object of the present invention is to provide a press-fit bushing which obviates any necessity for employing a stepped aperture for the accommodation of the bushing.

A further object of the invention is to provide an improved press-fit bushing which minimizes the possibility of its loosening after its assembly for operative use.

A still further object of the invention is to provide a press-fit bushing of simple and sturdy design, which can be easily and economically manufactured by conventional methods and machinists who do not possess a high degree of skill.

Other objects and advantages of the present invention will become apparent from the following description when read in connection with the accompanying drawings.

In the drawings.

Throughout the various views, similar numerals are employed to refer to similar parts of the invention.

The present invention contemplates the employment of stress-relieving means which will minimize any reduction of the inside diameter of the bushing which might otherwise occur when it is press-fitted into operative position. This will be better understood from the following discussion.

Figure 1:
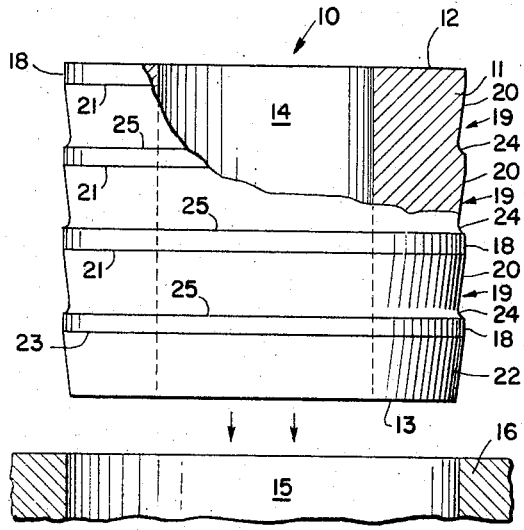
FIGURE 1 is an elevational view of one embodiment of the invention and of a cross-section of an aperture intended to accommodate the said embodiment of the invention.

As may be seen in FIGURE 1 of the accompanying drawing, one form of the present invention comprises a bushing, generally designated by the numeral 10 and including a generally cylindrical body 11, the upper and lower ends of which are defined by planar surfaces 12, 13 disposed transversely of the axis of the bushing 10, said surfaces corresponding respectively with the rearward and leading ends of the bushing. An axial aperture or passage 14 extends through the bushing 10 and is adapted to receive drilling, boring and reaming means, as well as other members conventionally accommodated by bushings.

The bushing 10 is disposable in an aperture 15 provided in a suitable housing such as a tooling plate 16. In accordance with conventional practice, the bushing 10 is intended to be press-fitted into the aperture 15, the bushing 10 being retainable in the aperture 15 by an interference fit.

The external circumferential periphery of the generally cylindrical body 11 includes a plurality of annular faces 18 which extend parallel to the axis of said generally cylindrical body 11. These annular faces 18 are interrupted by indentations formed by annular grooves 19, each of these grooves 19 being defined by an inclined annular surface 20 extending from an edge of one of the annular faces 18 and sloping inwardly of said generally cylindrical body. It has been found that such inclination of the annular surfaces 20 should preferably be at an angle of eight degrees with the axis of the body 11 although it is to be understood that said annular surfaces 20 may also be disposed to advantage at other inclinations.

The leading end 13 of the bushing 10 is also defined by an annular surface 22 which extends from the edge 23 of the adjacent annular face 18 and has an inclination similar to that of the annular surfaces 20. Each of the inclined annular surfaces 20 also terminates in an annular surface 24 which has a curved profile extending from an edge 25 of one of the annular faces 18.

The annular grooves 19 perform an important function in the present invention. Thus, when the bushing 10 is press-fitted into the aperture 15 so as to be confined therein in the position depicted in FIGURE 2, a corresponding stress is exerted upon the surface of the aperture 15 and upon the annular faces 18 of the bushing 10, with the result that there is a reduction in the diameter of the passage 14. However, neither the tendency to accomplish such diametral reduction nor the magnitude thereof is as great as that permitted by conventional bushings because the annular grooves 19 afford a stress-relief to the surface of the aperture 15.

Figure 3:
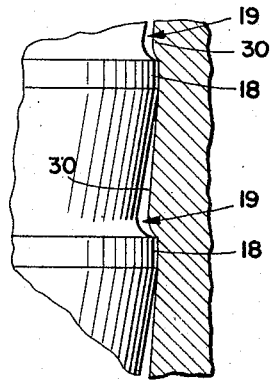
FIGURE 3 is an enlarged fragmentary, elevational view depicting the engagement of a portion of the said embodiment of the invention and the said aperture.
Figure 2:
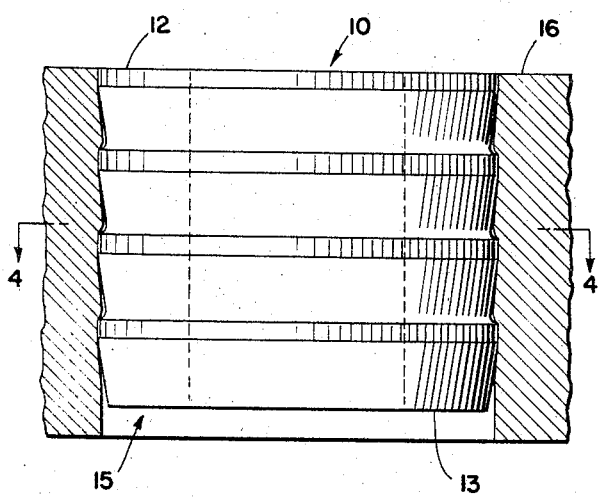
FIGURE 2 is a cross-sectional view of the said embodiment of the invention after its assembly in the said aperture.

This effect can be best noted in FIGURES 2 and 3 of the drawing. As may be seen in these figures, the annular grooves 19 allow radial flow of the internal surface 30 of the aperture 15 into the annular grooves 19, the internal surface 30 of said aperture 15 being restrained from undergoing such flow only in those areas where said surface 30 makes contact with the annular faces 18. Wherever such radial flow occurs, there is a corresponding stress relief on the surface 30 of the aperture 15 and a reduction in the stress communicated to the bushing 10, with the result that there is a reduction of any tendency to decrease the magnitude of the diameter of the passage 14.

At the same time, the aforesaid radial flow provides a mechanical obstruction which serves to minimize the possibility of accidental axial dislocation of the bushing 10 after its assembly in the aperture 15.

Moreover, since the annular grooves 19 and annular faces 18 can be uniformly spaced between the rearward and leading ends 12, 13 of the bushing, the aforesaid stress-relieving and obstructive effects can be evenly distributed between said ends of the bushing. There results a corresponding uniformity in the minimal diametral reduction which characterizes the bushing passage 14.

Figure 4:
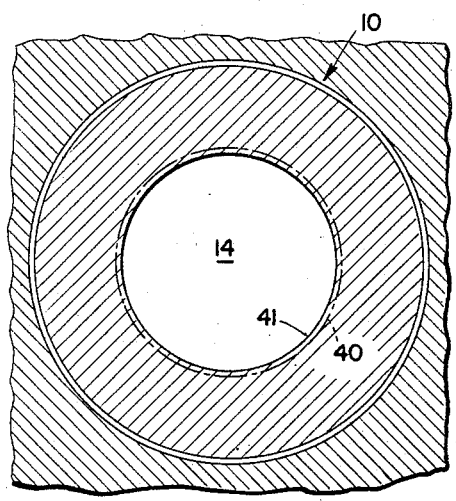
FIGURE 4 is a cross-sectional view taken about the line 4—4 of FIGURE 2 and depicting in dotted lines the position of the aperture in the bushing prior to its assembly in operative position.

FIGURE 4 depicts such a reduction in the bushing passage 14, the dotted line 40 therein representing the unstressed position of the internal surface of said passage 14 prior to assembly of the bushing 10 in the aperture 15, and the solid line 41 representing the position of the internal surface of said passage after the bushing 10 has been assembled in the aperture 15.

It will be seen from the foregoing that the present invention is easy to manufacture by conventional methods and does not require the high degree of precision and skill necessary in the manufacture of conventional bushings. Moreover, the invention achieves its objects while retaining simplicity and economy in its design.

The embodiment of the invention illustrated and described hereinabove has been selected for the purpose of clearly setting forth the principles involved. It will be apparent, however, that the present invention is susceptible to being modified in respect to details of construction, combination and arrangement of parts which may be resorted to without departure from the spirit and scope of the invention as claimed.

I claim:
1. In a press-fit bushing receivable in an aperture in a plate member, the combination comprising:
   (a) a body having a passage therethrough and provided with a forward and a rearward end, said forward end being of a lesser diameter than said rearward end;
   (b) the external circumferential periphery of said body including a plurality of grooves disposed transversely of the axis of the body;
   (c) said grooves accommodating radial flow of the internal periphery of the aperture when said press-fit bushing is engaged therewith, thereby providing stress-relief for said passage;
   (d) said grooves tapering outwardly rearwardly and communicating with the outermost portion of the external circumferential periphery of said body;
   (e) said grooves being wider than the adjacent outermost portions of the external circumferential periphery of said body.

2. In a press-fit bushing receivable in an aperture in a plate member, the combination comprising:
   (a) a generally cylindrical body having an axial passage therethrough adapted to accommodate drill means;
   (b) the external circumferential periphery of said generally cylindrical body including a plurality of annular grooves;
   (c) said annular grooves accommodating radial flow of the internal periphery of the aperture when said press-fit bushing is engaged therewith, thereby providing stress-relief for said axial passage;
   (d) said grooves tapering outwardly rearwardly and communicating with the outermost portion of the external circumferential periphery of said body;
   (e) said grooves being wider than the adjacent outermost portions of the external circumferential periphery of said body.

3. In a device according to claim 2;
   (a) the annular grooves being evenly spaced between the opposing ends of said generally cylindrical body, thereby providing uniform distribution of the stress-relief for said axial passage.

4. A press-fit bushing receivable in an aperture in a plate member, comprising:
   (a) a generally cylindrical body having an axial passage therethrough adapted to accommodate drill means;
      (i) the generally cylindrical body having opposing planar surfaces disposed transversely of the axis of the generally cylindrical body;
   (b) the external circumferential peripheral extremes of said generally cylindrical body including a plurality of annular faces and inclined annular indentations;
      (i) each of said inclined annular indentations extending from an edge of one of said annular faces and inwardly of said generally cylindrical body;
      (ii) each of said inclined indentations also terminating in a curved surface extending from an edge of one of said annular faces;
   (c) said inclined annular indentations accommodating radial flow of the internal periphery of the aperture when said press-fit bushing is engaged therewith, thereby providing stress-relief for said axial passage;
   (d) said inclined annular indentations being wider than said annular faces.

References Cited
UNITED STATES PATENTS

| | | | |
|---|---|---|---|
| 2,644,350 | 7/1953 | Regimbald | 77—62 |
| 2,997,902 | 8/1961 | Conner | 77—62 |
| 3,022,685 | 2/1962 | Armacost | 77—62 |

FRANCIS S. HUSAR, *Primary Examiner.*